UNITED STATES PATENT OFFICE 2,517,800

PROCESS FOR PREPARING ALPHA-IRONE ISOMERS BY CYCLIZATION OF PSEUDO-IRONES

Yves-René Naves, Geneva, Switzerland, assignor, by mesne assignments, to The Givaudan Corporation, a corporation of New Jersey No Drawing. Application August 31, 1948, Serial No. 47,152. In Switzerland May 4, 1948

2 Claims. (Cl. 260—587)

The invention relates to a process for obtaining a mixture of methyl-6, alpha-ionones (alpha-irones), rich in stereoisomer yielding a phenyl-4-semicarbazone melting at 164.5–165° and a dihydroketone (the semicarbazone of which melts at 172.5–173° and the dinitro-2.4-phenylhydrazone at 130–131°). One may admit, in our present state of knowledge, that this stereoisomer has the cis (2.6) structure (see Naves, Helvetica Chimica Acta, vol. 31, p. 905 (1948), whilst the stereoisomer giving a phenyl-4-semicarbazone, melting at 174.5–175.5° (see Naves, Grampoloff, Bachmann, Helvetica Chimica Acta, vol. 30, p. 1609 (1947); Naves, ibid. p. 2221) would have the trans (2.6) structure. The stereoisomer, the phenyl-4-semicarbazone of which melts at 164.5–165° (162–163°) is to be found under the racemic and active forms in the orris oil, to which it imparts the greatest part of its interest as regards perfumery (Naves, Bachmann, Helvetica Chimica Acta, vol. 30, p. 2222–2243 (1947); Naves vol. 31, p. 894 (1948).

The cyclization of pseudo-irones, by contact with sulfuric or phosphoric acid, by imitation of cyclization processes of pseudo-ionones, leads to mixtures in which predominates the dl-alpha-irone, the phenyl-4-semicarbazone of which melts at 174.5–175.5° (Naves, Helvetica Chimica Acta, vol. 31, p. 900, 910, 911 (1948) and publications referred to in the latter).

The invention object is a process for preparing methyl-6, alpha-ionones (alpha-irones) isomers, by cyclization of methyl-3-pseudo-ionones, featured by the use of boron trifluoride, acting in anhydrous medium, as cyclization agent of pseudo-irones, with the view to prepare mixtures rich in alpha-irones and more particularly in the stereoisomer the phenyl-4-semicarbazone of which melts at 164.5–165° and which constitutes the most important element for the perfumery of the ketonic products obtained from absolute orris oils.

In fact, it has been found that the use of boron trifluoride as cyclization agent, acting in anhydrous medium, gives a mixture of irones which is not only rich in alpha isomers, but more particularly in the isomer the phenyl-4-semicarbazone of which melts at 164.5–165°. The following description illustrates this process which, however, is not limited to the mentioned conditions, but includes the alternatives connected with changes of temperature, of concentration of the reagents, keeping due account of the stated limitations.

*Example*

103 grams of a technical preparation of pseudo-irones obtained by condensation of the methyl-3-citrals with acetone, having the following characteristics:

$d_4^{20}=0.9008$; $n_D^{20}=1.53420$
dispersion $n_F-n_C=0.02630$
percentage by oximation=93.4 and 300 grams of dry benzene have been chilled to 0° in an ice and salt mixture. In this well stirred mixture, 38 grams of boron trifluoride were introduced, during a period of 45 minutes, the temperature being maintained between 0° and 5°. As soon as some 33 grams of the reagent have been added, the temperture rose to 12–15°, in spite of the action of the chilling mixture and remained above 10° during ten minutes. As soon as the temperature has reached this last figure, after introduction of boron trifluoride is over, one has added, without interruption in the stirring, and in keeping the temperature below 10°, 560 cm.$^3$ of an 8% aqueous caustic soda solution. The color of the mixture, which had turned to dark brown during the introduction of boron trifluoride, quickly changed to pale yellow. When through with alkalinization, the benzene layer was decanted and washed neutral. Benzene was removed by distillation and the residue was fractionated by distillation under reduced pressure. The yield was 85.2 grams of irones, i. e. 82.7% of the theory, titrating 98.6% by oximation and containing, according to the dispersion of refractivity, 92 to 95% alpha-irones:

$d_4^{20}=0.9362$; $n_D^{20}=1.50142$
dispersion $n_F-n_C=0.01350$

This mixture was converted into phenyl-4-semicarbazone in the usual manner. 10 grams yielded, after fractional crystallization in alcohol, 3.4 grams of phenyl-4-semicarbazone M. P. 174.5–175.5° and 8 grams of phenyl-4-semicarbazone M. P. 164.5–165°. From the latter, one obtained, by hydrolysis with a boiling aqueous phthalic acid solution, 4.4 grams of dl-alpha-irone giving again the same phenyl-4-semicarbazone, having the physical properties of the alpha-irone isolated from the absolute orris oil, at the exclusion of the rotatory power, and developing the scent of the latter preparation. 2 grams, hydrogenated by contact with the nickel Raney catalyst, in presence of 30 cm.$^3$ of alcohol, at 20°, until absorption of a hydrogen equivalent, yielded the dihydro-alpha-irone, the semicarbazone of which melts at 172.5–173° and the dinitro-2.4- phenyl-hydrazone at 130–131°. None of the prepared products, mixed with the corresponding preparation obtained from the alpha-irone extracted from the orris absolute, has shown a lowering in the melting point.

The foregoing illustrates the invention, which however is not to be limited thereby but is to be limited solely by the appended claims.

I claim:

1. In the process for preparing methyl-6, alpha-ionones rich in the stereoisomer the phenyl-4-semicarbazone of which melts at 164.5–165° C., the improvement which comprises treating under anhydrous conditions the methyl-3-pseudo-ionones with boron trifluoride.

2. In the process for preparing methyl-6, alpha-ionones rich in the stereoisomer the phenyl-4-semicarbazone of which melts at 164.5–165° C., the improvement which comprises treating about 103 grams of methyl-3-pseudo-ionones under anhydrous conditions with about 38 grams of boron trifluoride at a temperature within the range of about 0°–5° C. for a period of about 45 minutes.

YVES-RENÉ NAVES.

REFERENCES CITED

The following references are of record in the file of this patent:

Davis et al., "Chemistry and Technology of Rubber," page 657, published 1937 by Reinhold Publishing Corp., New York.

Kastner, Angewandte Chemie, vol. 54, pages 273–281 (1941).

Royals, Ind. Eng. Chem., vol. 38, pages 546–548 (1946).

Naves et al., Helv. Chim. Acta., vol. 30, pages 1599–1613, October 15, 1947.

Schinz et al., Helv. Chim. Acta., vol. 30, pages 1810–1814, October 15, 1947.